United States Patent
Payne

(10) Patent No.: US 9,145,247 B2
(45) Date of Patent: *Sep. 29, 2015

(54) METHODS AND APPARATUS FOR PREPAID CARD PACKAGING

(71) Applicant: Anthony Lynn Payne, Gainesville, VA (US)

(72) Inventor: Anthony Lynn Payne, Gainesville, VA (US)

(73) Assignee: Oberthur Technologies of America Corp., Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,385

(22) Filed: Dec. 10, 2014

(65) Prior Publication Data

US 2015/0151890 A1    Jun. 4, 2015

Related U.S. Application Data

(63) Continuation of application No. 12/140,443, filed on Jun. 17, 2008, now Pat. No. 8,931,639.

(60) Provisional application No. 61/052,445, filed on May 12, 2008.

(51) Int. Cl.
| | |
|---|---|
| B65D 73/00 | (2006.01) |
| B65D 75/54 | (2006.01) |
| B65D 65/14 | (2006.01) |
| B32B 37/12 | (2006.01) |
| B32B 37/24 | (2006.01) |
| B32B 37/00 | (2006.01) |
| B32B 38/00 | (2006.01) |

(52) U.S. Cl.
CPC ............ *B65D 75/54* (2013.01); *B32B 37/0076* (2013.01); *B32B 37/1292* (2013.01); *B32B 37/24* (2013.01); *B32B 38/0012* (2013.01); *B65D 65/14* (2013.01); *B65D 73/0078* (2013.01); *B32B 2037/243* (2013.01); *B32B 2425/00* (2013.01)

(58) Field of Classification Search
CPC ....... B42D 15/045; B65D 75/20; B65D 73/00
USPC .................................................. 206/461–471
See application file for complete search history.

(56) References Cited

U.S. PATENT DOCUMENTS 8,931,639 B2    1/2015  Payne

*Primary Examiner* — Anthony Stashick
*Assistant Examiner* — Raven Collins
(74) *Attorney, Agent, or Firm* — Law Offices of Peter H. Priest, PLLC

(57) ABSTRACT

Techniques for providing cost effective and tamper evident prepaid card packaging are described. By containing a relatively wide glued area by gluing two relatively tin side panels together, the resulting package is highly resistant to being slit open on an edge without the effort to open the package being highly evident. A foldover magnetic stripe panel provides additional thickness to a portion of the package typically read by a magnetic strip reader while allowing very thin side panels.

20 Claims, 9 Drawing Sheets

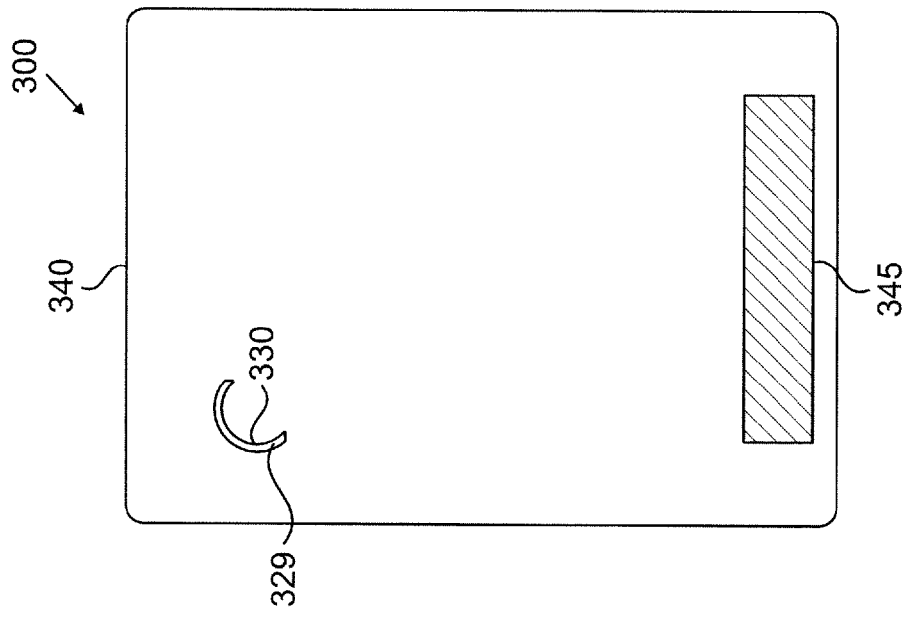
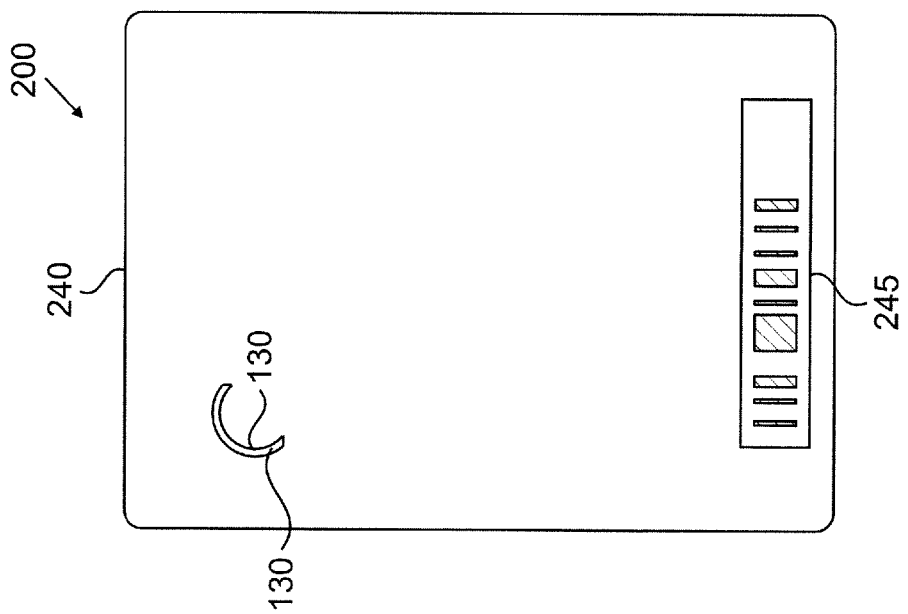

METHODS AND APPARATUS FOR PREPAID CARD PACKAGING

RELATED APPLICATIONS

The present application is a continuation of and claims the benefit of U.S. patent application Ser. No. 12/140,443 filed Jun. 17, 2008 which claims priority from U.S. Provisional Patent Application No. 61/052,445 filed May 12, 2008 both of which are incorporated herein by reference in their entirety.

FIELD OF INVENTION

The present invention relates generally to improvements in prepaid card packaging, and more particularly to advantageous aspects of paper packaging of prepaid cards.

BACKGROUND OF THE INVENTION

As prepaid cards have become more and more prevalent, techniques for cost effectively packaging such cards in a tamper evident manner are highly desirable. While a wide variety of previous approaches have been tried, many such approaches have failed to provide the right balance of features. For example, a highly secure package may be too hard to open by a legitimate customer after purchase, too expensive or both. A very cost effective package may be too susceptible to fraud.

SUMMARY OF THE INVENTION

To such ends, as well as to address other issues addressed further below, one aspect of the present invention addresses a bi-panel having a fold line with a first panel to one side of the fold line and a second panel to the other side of the fold line, the first panel having an area reserved for a product literature insert on an inside face and the second panel having an area reserved for a card located within a no glue region on an inside face; and a wide glue area between the no glue area and the edges of the second panel.

According to a further aspect of the invention, the fold line may be scored.

According to another aspect, the wide glue area is at least 0.5" wide and may advantageously be approximately 0.625" for standard credit card sized gift card.

In another aspect, glue is applied to the wide glue area, the bi-panel is folded about the fold line, and the glue is activated to form a tamper evident seal which is at least 0.5" wide and preferably is approximately 0.625" wide for a card which has standard sized credit card size.

In another aspect, the bi-panel is a material having a thickness ranging from 0.006"-0.016".

According to another aspect, the second panel has a magnetic stripe flap extending from a bottom edge.

In a further aspect, the magnetic stripe flap is folded about a fold line and glued to the back of the second panel. In this arrangement the bi-panel may suitable be 8 point paper and the flap is approximately 0.75" wide.

According to a further aspect, a bar code or bar codes or a magnetic stripe or both are located on an outside face of either the first or second panel or both.

Another aspect of the invention addresses a method for making a tamper evident card carrier comprising forming a bi-panel having a fold line with a first panel to one side of the fold line and a second panel to the other side of the fold line, the first panel having an area reserved for a product literature insert on an inside face and the second panel having an area reserved for a card located within a no glue region on an inside face; and a wide glue area between the no glue area and the edges of the second panel.

In a further aspect, this method comprises scoring the fold line.

According to another aspect, the method comprises applying glue to the wide glue area which is at least 0.5" wide and preferably is approximately 0.625" wide for a standard credit card sized card.

In another aspect, the method comprises gluing a gift card to the area for a card with fugitive glue; and gluing a product literature insert to the area for a product literature insert with fugitive glue.

Another aspect of a method addresses applying glue to the wide glue area; folding the bi-panel about the fold line; and activating the glue to form a tamper evident seal which is at least 5" wide.

In a further aspect of the method, the bi-panel is a material having a thickness ranging from 0.006"-0.016".

Another aspect of the method addresses forming a magnetic stripe on a flap extending from a bottom edge of the second panel.

Another aspect of the method comprises folding the flap about a fold line; and gluing the flap to the back of the second panel. Further in this method, the bi-panel may advantageously be 8 point paper and the flap is approximately 0.75" wide. Additionally the method may further comprise forming a bar code on a magnetic stripe on an outside face of either the first or second panel.

A more complete understanding of the present invention, as well as other features and advantages of the invention, will be apparent from the following detailed description, the accompanying drawings, and the claims.

BRIEF DESCRIPTION OF THE DRAWINGS

FIG. 2 shows the back of an assembled card carrier in accordance with a second alternative arrangement;

FIG. 3 shows an assembled card carrier in accordance with a third alternative arrangement;

DETAILED DESCRIPTION

Figure 1:
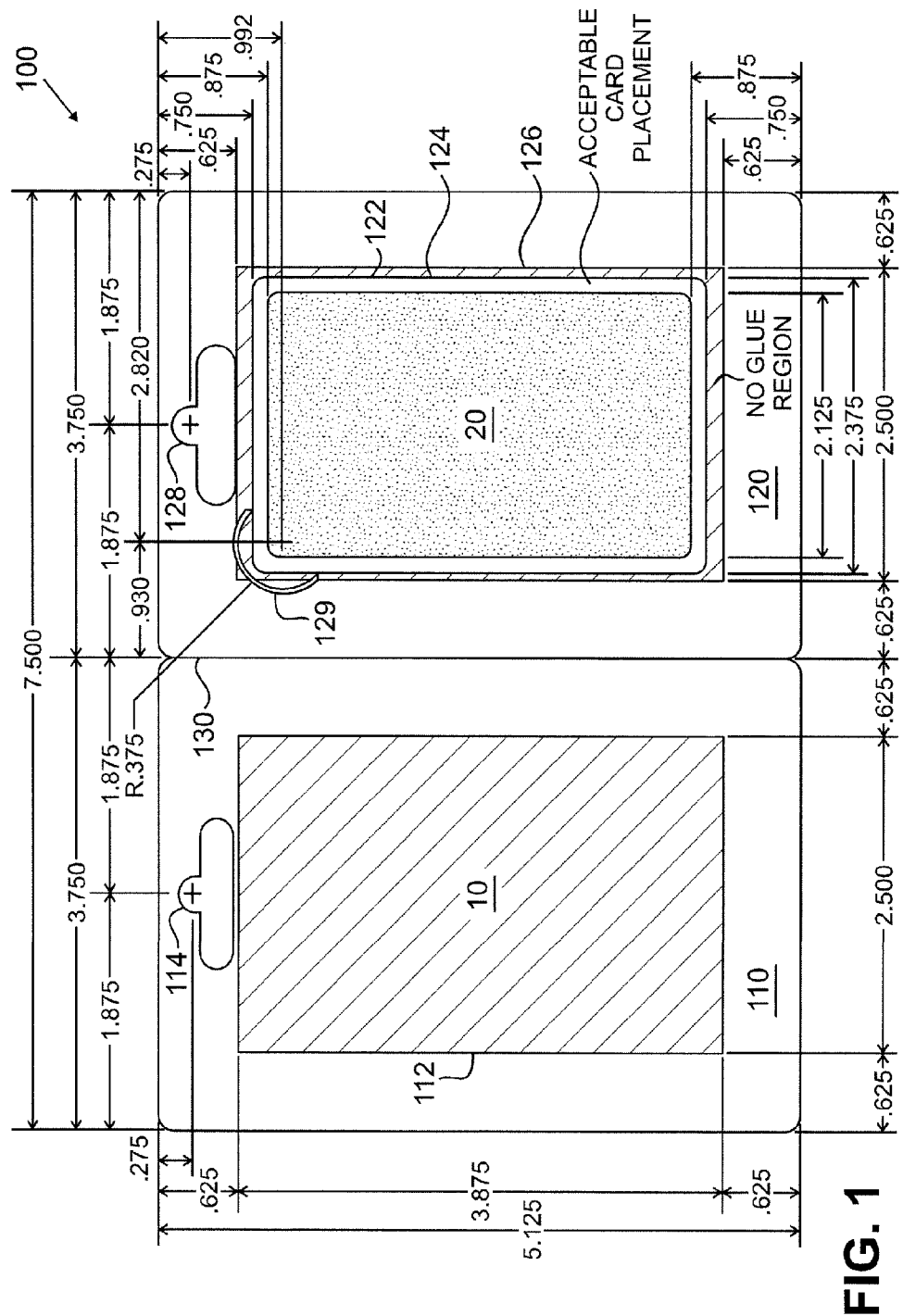
FIG. 1 shows an open card carrier blank utilized to form a gift card carrier in accordance with a first alternative of a first embodiment of the invention.

FIG. 1 shows a card carrier blank utilized to form a gift card carrier 100 in accordance with a first embodiment of the present invention. More specifically, FIG. 1 shows a bi-panel arrangement in which a first panel 110 and a second panel 120 are folded about a centerline 130 and glued shut to form a gift card carrier as described in further detail below. Aspects of two additional alternative gift card carriers of the first embodiment are illustrated in FIGS. 2 and 3, respectively. Illustrative dimensions are included in FIG. 1 for the gift card carrier 100 for use with a gift card which is the size of a standard credit card. A presently preferred material for carrier 100 is 12 point white paper having a nominal thickness of 0.012". It will be recognized that other dimensions may be suitably employed for cards having other dimensions and that materials other than paper may be suitably employed.

First panel 110 has a rectangular area 112 where a terms and condition pamphlet or other product literature insert 10 may be suitably attached with fugitive glue, for example, which allows the pamphlet or insert to be readily removed by a customer that purchases the gift card upon opening the carrier 100. First panel 110 also includes a first smaller hangtag cutout 114.

Second panel 120 has a first rectangular area 122 where a gift card 20 is suitably attached with fugitive glue, for example, allowing the gift card to be readily detached from the carrier once a customer has purchased the gift card and opened the carrier 100. A second area 124 is a tolerance area within which the gift card may be acceptably mounted. In FIG. 1, card 20 is shown centered within the tolerance area 124. A third area 126 defines a no glue region. Third area 126 is larger than the acceptable card placement area 124 so that a no glue buffer surrounds the card 20. Second panel 120 also includes a second larger hangtag cutout 128. Additionally, the second panel 120 includes a semicircular slot 129.

In this embodiment, glue is adhered or otherwise applied around the edges of both panels 110 and 120. In one approach, the glue is applied everywhere except the glue free zones with a glue applicator as part of the process of printing the card carrier with any text, such as the manufacturer's name or logo, the card company, name, logo and the like, or any other printed text, advertising materials and the like that are desired to be printed on the carrier 100.

Then, the gift card 20 is attached to the panel 120, and the pamphlet or product literature insert 10 is attached to panel 110. The panels are folded together about centerfold line 130 like a clamshell so that the cutouts 114 and 128 form a hangtag opening for hanging the gift card sealed in the carrier 100 for display. Where glue applied during printing is utilized, heat and pressure are applied to activate the glue and to seal the panels 110 and 120 together The seal formed is preferably at least 0.5" wide and even more preferably is approximately 0.625" wide which is the case when glue is applied everywhere except the glue free zones. In a second approach, after the booklet and card are attached, hot melt glue is applied to one or both of the panels 110 and 120 in a bead or in dots with a pressure gun applicator. Where hot melt glue is employed, the closed carrier is rolled between rollers as the glue cools and sets so that the glue is applied uniformly and a wide area seal is formed.

In a first alternative of the first embodiment, the exterior of carrier 100 does not include any further external features though it will be recognized that as noted above a wide variety of printed material may be added as desired.

FIG. 2 shows back panel 140 of a second alternative carrier 200 after the panels 110 and 120 have been glued together. In the alternative shown, a barcode 245 is printed on the back panel 240 of the carrier 200. This barcode 245 may be utilized as an activation reference code. Additional bar codes not shown may be utilized as a sales reference code to be scanned by a bar code scanner in a known manner, for manufacturing tracking purposes, or the like.

When the two panels 110 and 120 have been folded and glued together, it is seen from FIG. 1 that the bottom edge of card 20 is 0.875" above the bottom edge of carrier 100. If the bottom edge of card 20 is placed at the bottom of the acceptable card placement area, it is still 0.750" above the bottom edge of carrier 200. It is further seen from FIG. 1 that with the approach in which glue is applied during printing, glue can be applied in a relatively wide area 0.625" wide all around the no glue region 126. With the application of hotmelt glue a similarly broad swath of glue can surround the no glue region 126.

As further seen in FIG. 2, upon assembly of the carrier 100, slot 129 results in an external opening tab 130 which can be pulled by a purchaser to begin to tear open the carrier 100 to get access to the gift card sealed inside. It also creates a vent which allows internal air to escape upon a change of temperature, pressure or the like without damaging the seal. Finally, it also allows a simple visual confirmation that a card is contained in the carrier 100. It will be recognized that alternative venting slots may be employed, such as a simple parenthesis shaped arc or arcs, or a diagonal cut or cuts. As a first example, if a shipment of gift cards is being transported by truck to Phoenix on a hot summer day, the high temperature in the truck might cause the internal air to expand. If the package had an airtight seal, that seal or the packaging could be damaged. As a second example, if a gift card in a sealed carrier is purchased and sent by air as a Christmas gift, the change in air pressure as the plane goes from near sea level to altitude would result in expansion of the interior air if the package was perfectly sealed, again possibly damaging the seal or the package.

A third alternative gift card carrier 300 is illustrated in FIG. 3. In this alternative, the gift card carrier 300 is preferably formed from a blank like that of FIG. 1; however, the back surface 340 of the assembled card 300 has a magstripe 345 rather than the barcode 345 shown in FIG. 2. Although not shown, it will be recognized that a further alternative employs both a barcode or barcodes and a magstripe.

It is presently preferred that the magstripe 345 of carrier 100 be readable by a standard magstripe reader designed for reading the magstripe on a standard credit card. Such a credit card has a nominal thickness of 30 mils or 0.030". As a result, the rollers of the standard credit card reader are spaced so that a card somewhat thicker or thinner than 0.030 inches can be read, but cards substantially thicker or thinner may be susceptible to jamming or fail to read as a result of the failure of the magnetic stripe to register with the read head.

With card 20 having a nominal thickness of 30 mils and two layers of 12 point paper, the thickness of carrier 100 where the card is sandwiched is approximately 0.054". However, the bottom 0.750" at the bottom of carrier 100 where magstripe 345 is found is only approximately 0.024" thick and can be fed through the rollers of a standard swipe reader.

A further advantage of all three alternative carriers 100, 200 and 300 of the first embodiment is that the thinness of the 12 point paper stock and the width of the glued area between the card 20 and the edges of carriers makes the resulting carriers highly tamper evident with respect to a type of fraud where someone intent on removing cards without detection takes a razor, knife, or the like and attempts to slit open the carrier on one of its edges. Where a glue is selected so that it is harder to cut or as hard to cut as the paper and the paper is thin so that it does not provide a guide for the cutting edge, one intent on fraud cannot readily cut the carrier open without the tampering being evident by causing visual damage to the carrier.

Figure 4:
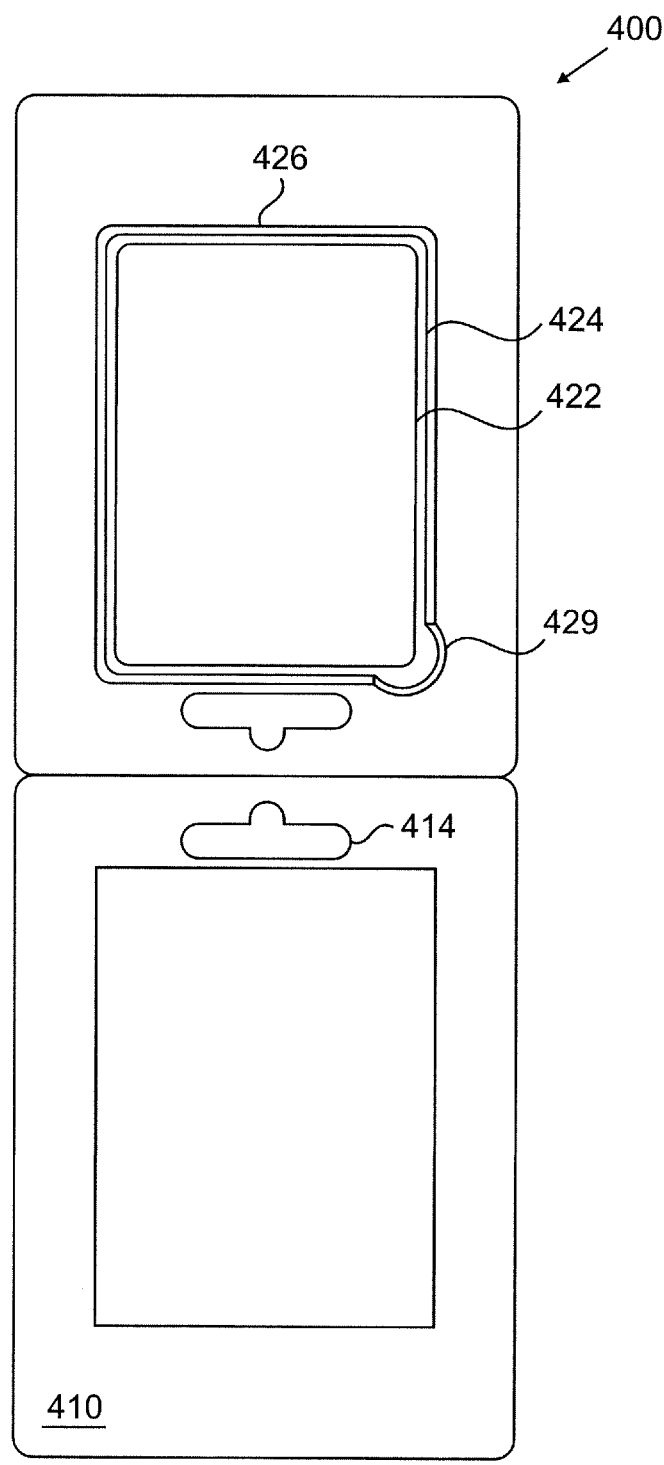
FIG. 4 shows an open card carrier blank utilized to form a gift card carrier in accordance with a second embodiment of the invention.

Aspects of a second embodiment of a card carrier in accordance with the present invention are illustrated in FIG. 4. In FIG. 4, a top fold tablet card carrier 400 is illustrated. Similar to the embodiment of FIG. 1, a first panel 410 includes a first area 412 reserved for a terms and conditions pamphlet or other product literature insert. No literature is shown in FIG. 4. First panel 410 also includes a first smaller hangtag cutout 414.

Second panel 420 has a first area 422 reserved for attaching a gift card. No gift card is shown in FIG. 4. A second area 424 illustrates a larger tolerance area within which the gift card may be acceptably mounted. A third area 426 defines a no glue region. Second panel 420 also includes a second larger hangtag cutout 428. Additionally, the second panel 420 includes a semicircular slot 429.

In this second embodiment, glue is applied around the edges of second panel 420 in either of the two ways described above in connection with FIG. 1. A gift card is attached to the panel 420. A terms and condition pamphlet or other product literature insert is attached to panel 410. Glue may be preapplied during printing as discussed above and the panels are then folded together about top fold line 430. The package is then sealed using a high pressure heat press that activates the glue as discussed above. Alternatively, as also discussed above, hot melt glue may be applied and then after folding the panels together, the card carrier is rolled under pressure rollers to seal the package with a wide seal area. In a first alternative, the carrier 400 has no external barcode or magstripe. In a second alternative, the carrier 400 has a barcode as seen in FIG. 2 and in a third alternative, the carrier 400 has a magstripe as seen in FIG. 3.

Figure 5:
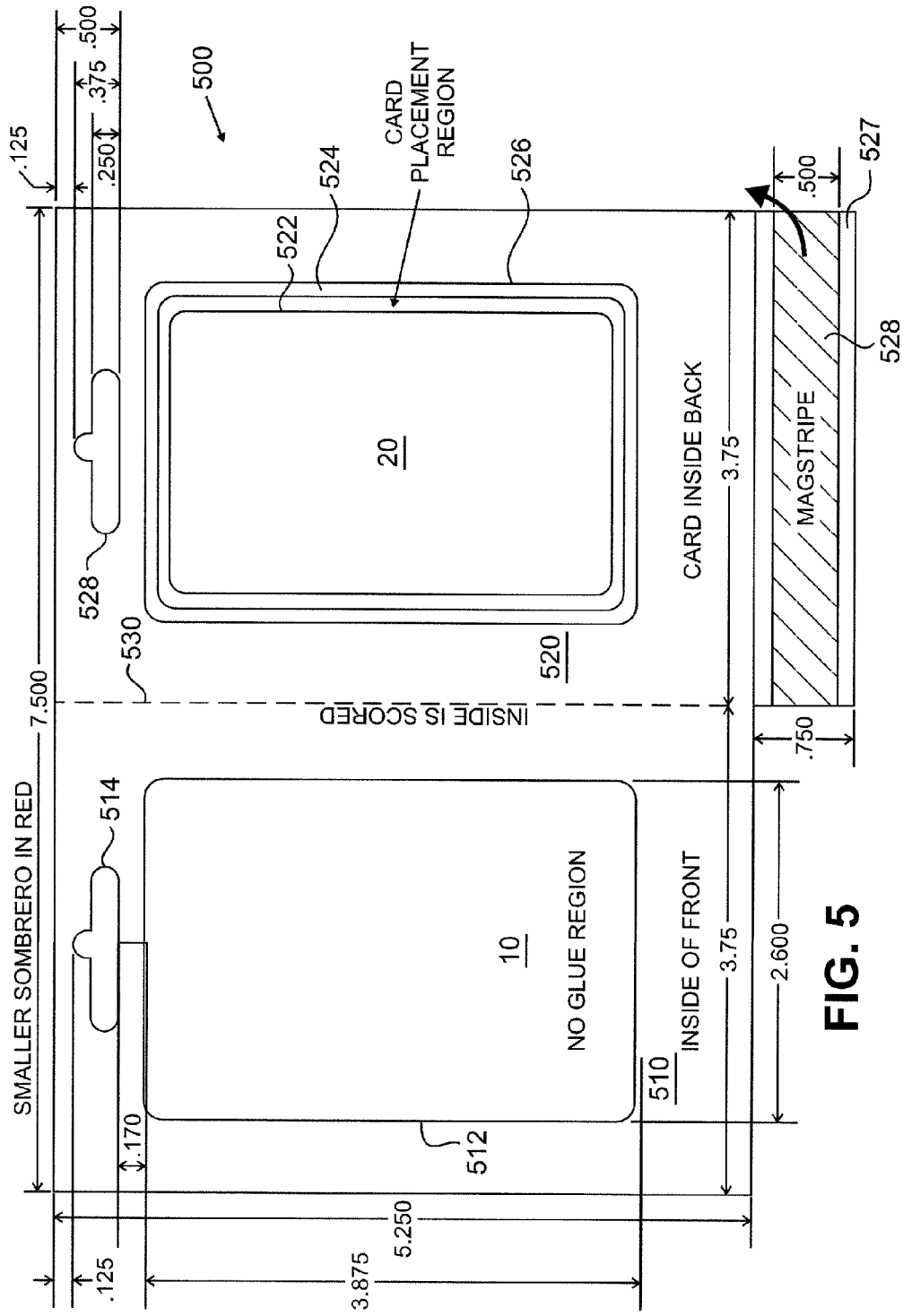
FIGS. 5-7 show the inside of an open paper blank utilized to form a gift card carrier in accordance with a third embodiment of the invention; the outside of the blank illustrating the foldover of a magstripe to the outside back; the magstripe folded over and glued to the outside back; and perforations of the outside back and front; respectively, of the third embodiment of the invention.

FIG. 5 shows a gift card carrier blank used to form a gift card carrier 500 in accordance with a third embodiment of the present invention. More specifically, FIG. 5 shows a bi-panel arrangement in which a first panel 510 and a second panel 520 are folded about a centerline 530 and glued shut to form a gift card carrier as described in further detail below. Illustrative dimensions are included in FIG. 5 for the gift card carrier 500 for use with a gift card which is the size of a standard credit card. A presently preferred material for carrier 500 is 8 point white paper having a nominal thickness of 0.008" It will be recognized that other dimensions may be suitably employed for cards having other dimensions.

First panel 510 has a rectangular area 512 where a teens and condition pamphlet or other product literature insert 10 is suitably attached with fugitive glue, for example, which allows the booklet to be readily removed by a customer that purchases the gift card upon opening carrier 500. First panel 510 also includes a first smaller hangtag cutout 514. In this embodiment, area 512 is also a no glue area and glue may be applied during printing outside this area or hot melt glue may be applied as discussed above.

Second panel 520 has a first area 522 where a gift card 20 is suitably attached with fugitive glue, for example, allowing the gift card to be readily detached from the carrier. A second area 524 illustrates a tolerance area within which the gift card may be acceptably mounted. A third area 526 defines a no glue region. Third area 526 is larger than the acceptable card placement area 524 so that a no glue buffer surrounds the card 20. Second panel 520 also includes a second larger hangtag cutout 528. Additionally, the second panel 520 includes a three quarter inch flap 527 with a half inch magstripe 528. As discussed further in connection with FIGS. 6 and 7 below, the flap 527 is folded over to the back of carrier 500 and glued to the back of second panel 520.

Figure 6:
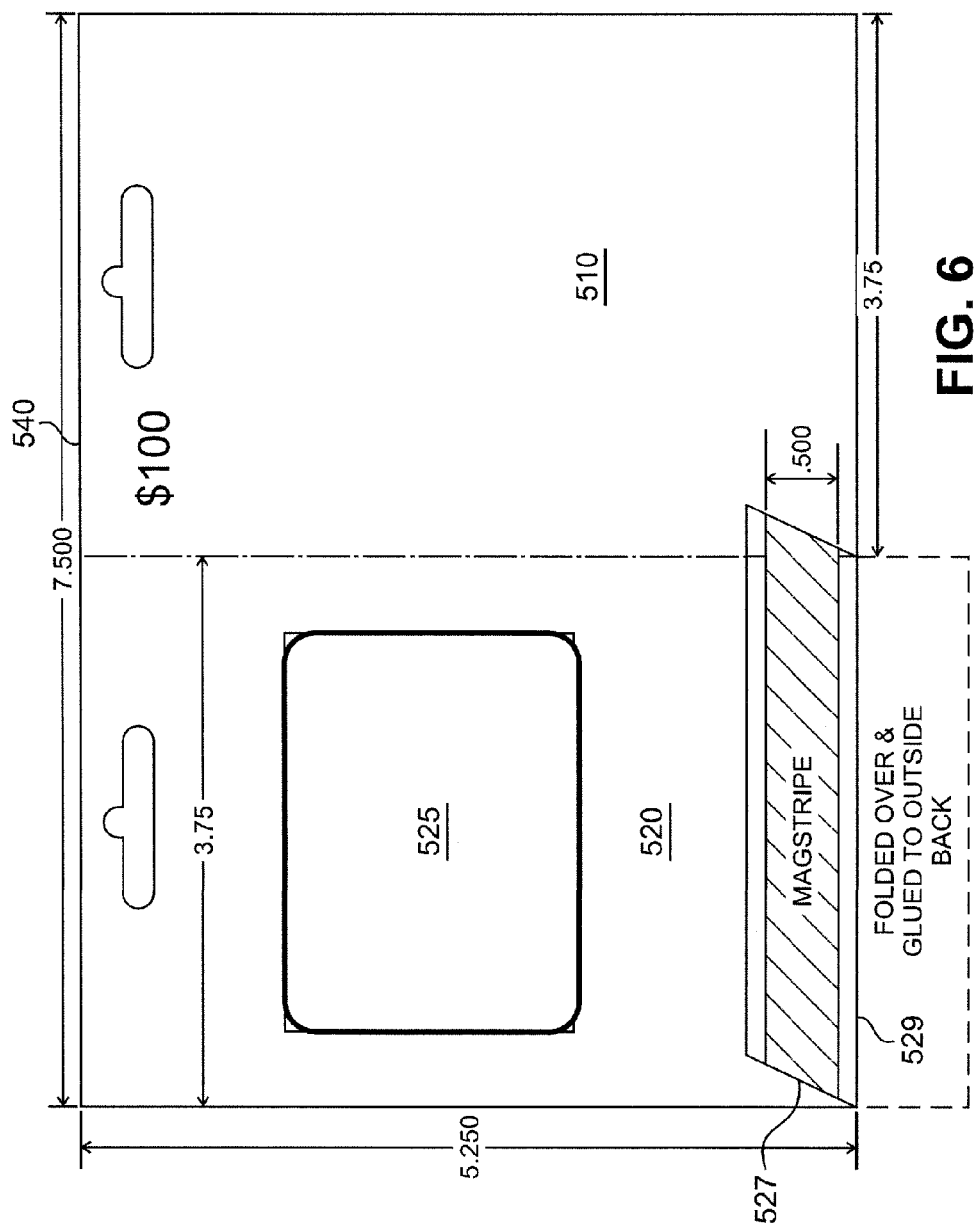

FIG. 6 shows back 540 of the carrier 500 with the flap 527 in the process of being folded about fold line 529. In a presently preferred embodiment, the back of panel 520 also includes a white area 525 for the printing of a barcode or other desired information.

Figure 7:
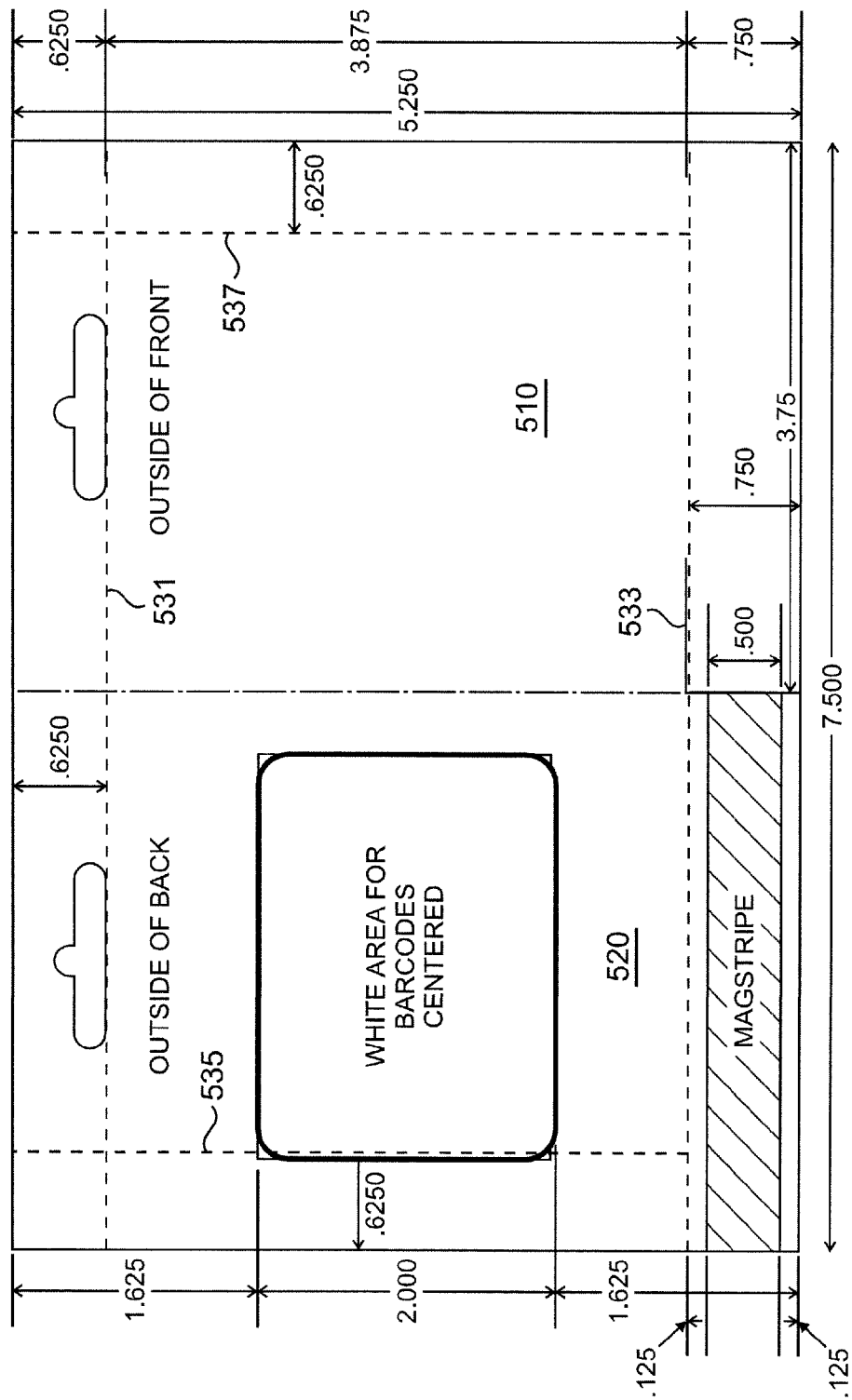

As seen in FIG. 7, the flap 527 has now been glued to the back of the panel 520. Since the flap has a thickness of 0.008" and each panel has a thickness of 0.008", the total thickness of the finished carrier 500 at the magstripe is 0.024" so the magstripe can be read by a typical magstripe reader as discussed above.

FIG. 7 further illustrates a number of lines of perforations 531, 533, 535 and 537. In a presently preferred embodiment, these perforations are cut by a disc with 12 teeth per inch. The cuts are 0.0150" and ties are 0.0075". The resulting perforations allow the customer purchasing the end product to tear it open after purchase to obtain access to the card 20 and literature 10. Someone intent on fraud cannot readily open the package without it being tamper evident.

In this third embodiment, after folding and gluing bottom panel 527 to the back panel, glue is applied around the edges of second panels 510 and 520. In one approach, the glue is applied everywhere except the glue free zones 512 and 526 as part of the process of printing the card carrier with any text, such as the manufacturer's name or logo, the card company, name, logo and the like, or any other printed text, advertising materials and the like that are desired to be printed on the carrier 500. In a second approach, hot melt glue is applied outside the glue free zones to one or both of the panels 510 and 520 in a bead or in dots with a pressure gun applicator.

Then, the gift card 20 is attached to the panel 520. The product literature booklet 10 is attached to panel 510. The panels are folded together about scored centerfold line 530 like a clamshell so that the cutouts 514 and 528 form a hangtag opening for hanging the gift card sealed in its carrier 500 for display. Where printed glue is utilized, heat and pressure are applied to activate the glue and to seal the panels 510 and 520 together. Where hot melt glue is employed, the closed carrier is rolled between rollers as the glue cools and sets.

When the two panels 510 and 520 have been folded and glued together, it is seen from FIG. 8 that the bottom edge of card 20 is more than 0.750" above the bottom edge of carrier 500. With the bottom edge of card 20 placed at the bottom of the acceptable card placement area, it is still at least 0.750" above the bottom edge of carrier 500. It is further seen from FIG. 7 that with the printed glue approach, glue can be applied in a wide area 0.625" wide all around the no glue regions 512 and 526. With the application of hotmelt glue, a similarly broad swath of glue can surround these no glue regions.

Upon purchase of the carrier 500, the perforations can be torn by a purchaser to tear open the carrier 500 to get access to the gift card sealed inside.

It is presently preferred that the magstripe 528 of carrier 500 be readable by a standard magstripe reader utilized for reading the magstripe on a standard credit card. Such a credit card has a nominal thickness of 30 mils or 0.030". As a result, the rollers of the standard credit card reader are spaced so that a card somewhat thicker or thinner than 0.030 inches can be read, but cards substantially thicker or thinner may be susceptible to jamming or fail to read as a result of the failure of the magnetic stripe to register with the read head.

With card 20 having a nominal thickness of 30 mils and two layers of 8 point paper, the thickness of carrier 500 where the card is sandwiched is approximately 0.046". However, the bottom 0.750" at the bottom of carrier 300 where magstripe 345 is found is 0.024" thick and can be fed through the rollers of a standard swipe reader.

A further advantage of the carrier 500 is that the thinness of the 8 point paper stock and the width of the glued area between the card 20 and the edges of the carrier makes the resulting carrier highly tamper evident with respect to a type of fraud where someone intent on stealing cards takes a razor, knife, or the like and attempts to slit open the carrier on one of its edges. Where a glue is selected so that it is harder to cut or as hard to cut as the paper and the paper is thin so that it does not provide a guide for the cutting edge, one intent on fraud cannot readily cut the carrier open without the tampering being evident.

While a presently preferred third embodiment is shown, it will be recognized that variations on this embodiment may be readily made by those of skill in the art. For example, with 6 point paper, inside front panel 510 can also have a foldover flap like the magstripe flap 527 but without a magstripe, so that the overall thickness is still 0.024" a the bottom where the magstripe is to be passed through a magstripe reader. Decorative edging or printing may be applied to the front panel flap so it is aesthetically pleasing to purchasers.

Figure 8B:
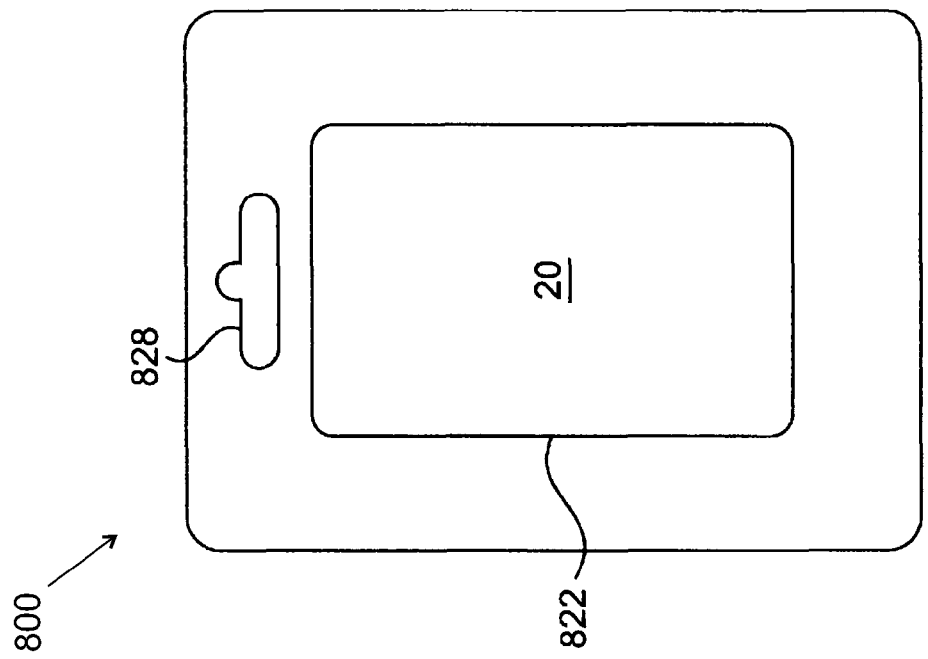
FIGS. 8A and 8B (collectively FIG. 8) show a fourth embodiment of the invention.
Figure 8A:
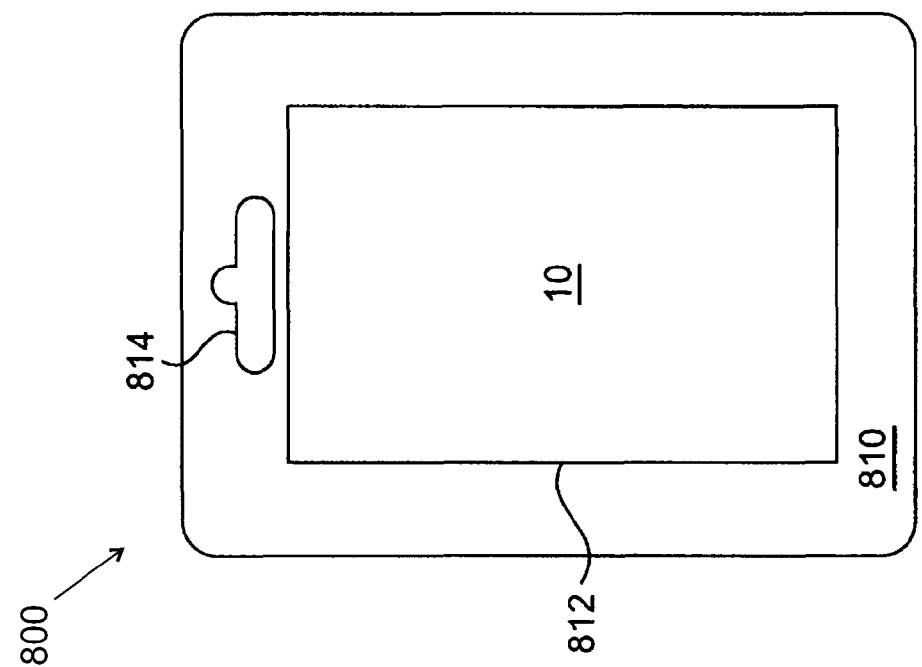

FIGS. 8A and 8B (collectively FIG. 8) show a fourth embodiment of a card carrier 800 in accordance with the present invention. In FIG. 8, a first panel 810 of 24 point white paper and a separate second panel 820 of 24 point white paper are shown. For standard credit card sized gift cards, the dimensions of these two panels will preferably be the same as those shown for panels 110 and 120 in FIG. 1, respectively. Panel 810 has a first smaller hangtag cutout 814. Panel 820 has a second larger hangtag cutout 828. As addressed above, it will be recognized that thinner paper may be employed in place of 24 point white paper and that an overall bottom thickness of 0.048" will be too thick for reading with a standard magstripe reader with an approximately 30 mil reader head spacing.

First panel 810 has a rectangular area 812 where a terms and conditions pamphlet or other product literature insert 10 may be suitably attached with fugitive glue, for example, which allows the booklet to be readily removed by a customer that purchases the gift card upon opening carrier 800. Second panel 820 has a first area 822 where gift card 20 is suitably attached with fugitive glue. In this fourth embodiment glue is adhered round the edges of either of the two panels 810 and 820. The two panels are aligned together and the glue is activated as discussed above.

Figure 9A:
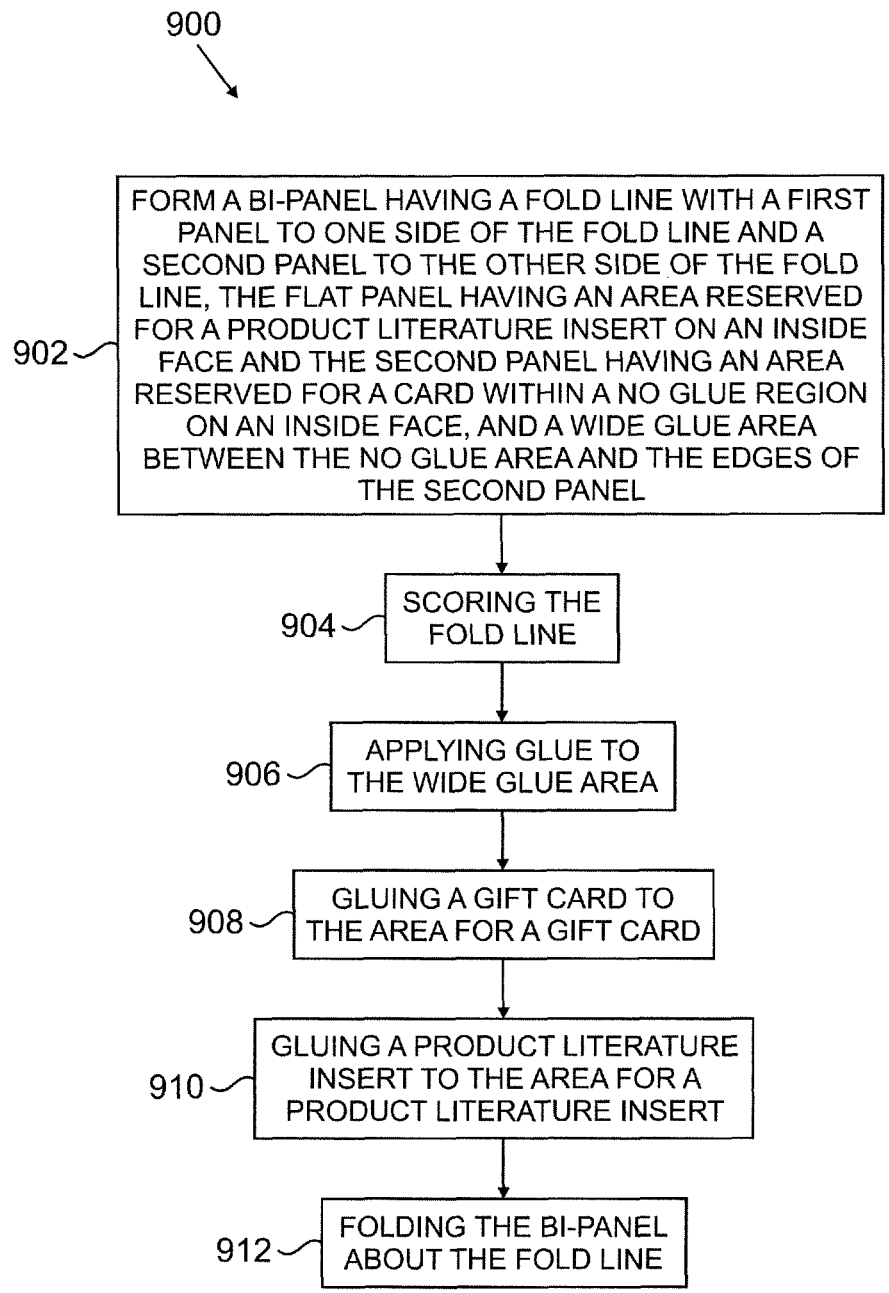
FIGS. 9A and 9B (collectively FIG. 9) show a method for making a card carrier in accordance with the present invention.
Figure 9B:
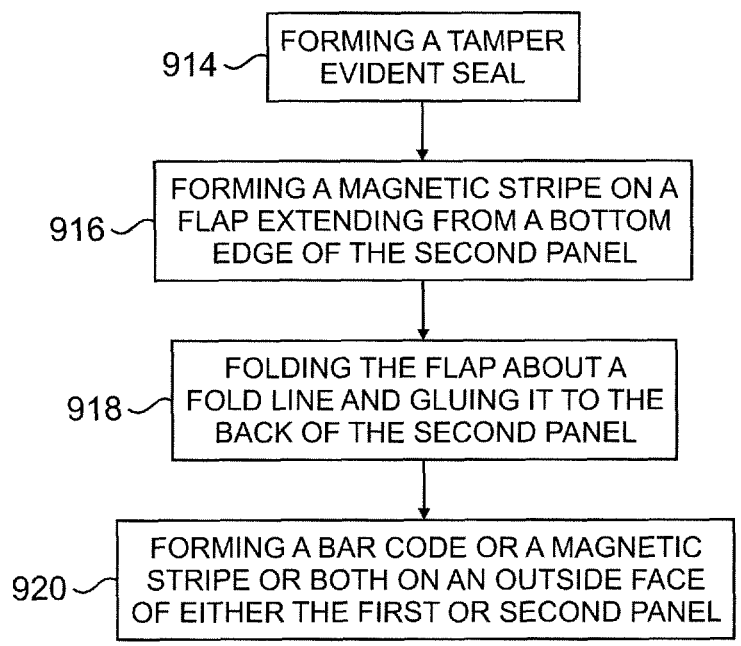

FIGS. 9A and 9B (collectively FIG. 9) illustrate aspects of a method 900 of making a tamper evident card in accordance with the present invention. In step 902, a bi-panel is formed having a fold line with a first panel to one side of the fold line, the first panel having an area reserved for a product literature insert on an inside face and the second panel having an area reserved for a card located within a no glue region on an inside face. A wide glue area between the no glue area and the edges of the second panel is also established.

In step 904, the fold line is scored. In step 906, glue is applied to the wide glue area. The wide glue area is preferably at least 0.5" wide and for a standard credit card sized card may advantageously be 0.625" wide.

In step 908, a gift card is glued to the area for a card with fugitive glue. In step 910, a product literature insert is glued to the area for a product literature insert with fugitive glue.

In step 912, the bi-panel is folded about the fold line. In step 914, the glue is activated to form a tamper evident seal which is at least 0.5" wide.

In an optional step 916, a magnetic stripe is formed on a flap extending from a bottom edge of the second panel. In an optional step 918, the flap is folded about a fold line and glued to the back of the second panel.

In a further optional step 920, a bar code or a magnetic stripe or both are formed on an outside face of either the first or second panel.

While the present invention has been disclosed in the context of various aspects of presently preferred embodiments, it will be recognized that the invention may be suitably varied and applied to other environments consistent with the teachings above and the claims which follow. By way of example, while the present invention is described in connection with embodiments for standard credit card sized cards, it will be recognized that the present teachings may be adapted to other shapes and sizes of cards, such as key fob or key chain cards, smart cards, and the like. Further, while the present invention is described in connection with embodiments in which paper is employed, it will be recognized that various other types of materials, such as plastics and the like, may be suitably employed so long as that material can be cut, folded and adhered consistent with the teachings herein. Additionally, while presently preferred approaches to gluing panels together have been described, variations thereon will be readily adapted to the demands of a particular environment or context.

I claim:

1. A tamper evident card carrier comprising:
   a first panel having an inside face having an area reserved for a product literature insert on the inside face;
   a second panel having an inside face having an area reserved for a card located within a no glue region on the inside face;
   a gift card attached to the area reserved for a card; and
   a wide glue area between the no glue area and the edges of the second panel.

2. The tamper evident card carrier of claim 1 wherein the wide glue area is at least 0.5" wide.

3. The tamper evident card carrier of claim 1 wherein a gift card is attached to the area for a card with fugitive glue; and
   a product literature insert is attached to the area for a product literature insert.

4. The tamper evident card carrier of claim 3 wherein glue is applied to the wide glue area, the inside face of the first panel and the inside face of the second panel are placed against each other, and the glue is activated to form a tamper evident seal which is at least 0.5" wide on all four sides of the tamper evident card carrier.

5. The tamper evident card carrier of claim 1 wherein the first panel is a material having a thickness ranging from 0.006"–0.016".

6. The tamper evident card carrier of claim 1 wherein the second panel is a material having a thickness varying from 0.006"-0.016".

7. The tamper evident card carrier of claim 1 wherein the second panel has a magnetic stripe.

8. The tamper evident card carrier of claim 7 wherein the magnetic stripe is formed on a flap extending from a bottom edge of the second panel and the flap is folded about a fold line and glued to the back of the second panel.

9. The tamper evident card carrier of claim 8 wherein the bi-panel is 8 point paper and the flap is approximately 0.75" wide.

10. The tamper evident card carrier of claim 1 further comprising a bar code or a magnetic stripe on an outside face of either the first or second panel.

11. A method for making a tamper evident card carrier comprising:
    forming said carrier from a first panel and a second panel, the first panel having an area reserved for a product literature insert on an inside face and the second panel having an area reserved for a card located within a no glue region on an inside face; and
    a wide glue area between the no glue area and the edges of the second panel.

12. The method of claim 11 further comprising:
    applying glue to the wide glue area which is at least 0.5" wide.

13. The method of claim 11 further comprising:
    gluing a gift card to the area for a card with fugitive glue; and gluing a product literature insert to the area for a product literature insert with fugitive glue.

14. The method of claim 13 further comprising:
applying glue to the wide glue area;
placing the inside face of the first panel and the inside face of the second panel against each other; and
activating the glue to form a tamper evident seal which is at least 5" wide.

15. The method of claim 11 wherein the first panel is a material having a thickness ranging from 0.006"–0.016".

16. The method of claim 11 wherein the second panel is a material having a thickness ranging from 0.006"-0.016".

17. The method of claim 11 further comprising:
forming a magnetic stripe on a flap on the second panel.

18. The method of claim 17 wherein the flap extends from a bottom edge of the second panel and further comprising:
folding the flap about a fold line; and
gluing the flap to the back of the second panel.

19. The method of claim 18 wherein the second panel is 8 point paper and the flap is approximately 0.75" wide.

20. The method of claim 11 further comprising:
forming a bar code or a magnetic stripe on an outside face of either the first or second panel.

* * * * *